United States Patent
Friesen et al.

(10) Patent No.: US 11,285,435 B2
(45) Date of Patent: Mar. 29, 2022

(54) SYSTEMS AND METHODS FOR GENERATING LIQUID WATER USING HIGHLY EFFICIENT TECHNIQUES THAT OPTIMIZE PRODUCTION

(71) Applicant: Zero Mass Water, Inc., Scottsdale, AZ (US)

(72) Inventors: Cody Friesen, Fort McDowell, AZ (US); Kamil Salloum, Tempe, AZ (US); Grant Friesen, Scottsdale, AZ (US); Heath Lorzel, Mesa, AZ (US); Kimberly McGuinness, Phoenix, AZ (US)

(73) Assignee: SOURCE GLOBAL, PBC, Scottsdale, AZ (US)

( * ) Notice: Subject to any disclaimer, the term of this patent is extended or adjusted under 35 U.S.C. 154(b) by 201 days.

(21) Appl. No.: 16/657,935

(22) Filed: Oct. 18, 2019

(65) Prior Publication Data
US 2020/0122083 A1 Apr. 23, 2020

Related U.S. Application Data

(60) Provisional application No. 62/772,393, filed on Nov. 28, 2018, provisional application No. 62/748,285, filed on Oct. 19, 2018.

(51) Int. Cl.
*B01D 53/26* (2006.01)
*B01D 53/047* (2006.01)
(Continued)

(52) U.S. Cl.
CPC ....... *B01D 53/261* (2013.01); *B01D 53/0438* (2013.01); *B01D 53/0446* (2013.01);
(Continued)

(58) Field of Classification Search
CPC .............. B01D 53/261; B01D 53/0438; B01D 53/0446; B01D 53/047; B01D 53/263;
(Continued)

(56) References Cited

U.S. PATENT DOCUMENTS 2,138,689 A 11/1938 Altenkirch
2,462,952 A 3/1949 Dunkak
(Continued)

FOREIGN PATENT DOCUMENTS

CN 1774401 5/2006
CN 1325854 7/2007
(Continued)

OTHER PUBLICATIONS

WO9907951A1_ENG (Espacenet machine translation of Buerger) (Year: 1999).*
(Continued)

*Primary Examiner* — Jonathan Miller
*Assistant Examiner* — Gabriel E Gitman
(74) *Attorney, Agent, or Firm* — Snell & Wilmer L.L.P.

(57) ABSTRACT

Systems and methods for producing water from process gas are provided herein. The systems include a water generating system that adjusts the pressure and temperature conditions surrounding a hygroscopic material in order to release water vapor generated by exposure of the hygroscopic material to the process gas.

30 Claims, 7 Drawing Sheets

(51) Int. Cl.
  *B01D 53/04* (2006.01)
  *B01D 53/30* (2006.01)
  *E03B 3/28* (2006.01)
(52) U.S. Cl.
  CPC ............ *B01D 53/265* (2013.01); *B01D 53/30*
    (2013.01); *E03B 3/28* (2013.01); *B01D 53/047*
    (2013.01); *B01D 53/263* (2013.01); *B01D*
    *2257/80* (2013.01); *B01D 2259/40086*
    (2013.01); *B01D 2259/40088* (2013.01)
(58) Field of Classification Search
  CPC .. B01D 53/265; B01D 53/30; B01D 2257/80;
    B01D 2259/40086; B01D 2259/40088;
    B01D 2259/802; B01D 1/0035; B01D
    1/0058; B01D 5/003; B01D 5/0069;
    Y02A 20/00; Y02A 20/212; E03B 3/28
  See application file for complete search history.

(56) References Cited

U.S. PATENT DOCUMENTS

| | | |
|---|---|---|
| 2,700,537 A | 1/1955 | Pennington |
| 2,761,292 A | 9/1956 | Coanda et al. |
| 3,102,532 A | 9/1963 | Shoemaker |
| 3,400,515 A | 9/1968 | Ackerman |
| 3,676,321 A | 7/1972 | Cummings et al. |
| 3,740,959 A | 6/1973 | Foss |
| 3,889,532 A | 6/1975 | Pilie et al. |
| 4,054,124 A | 10/1977 | Knoos |
| 4,080,186 A | 3/1978 | Ockert |
| 4,117,831 A | 10/1978 | Bansal et al. |
| 4,134,743 A | 1/1979 | Macriss et al. |
| 4,136,672 A | 1/1979 | Hallanger |
| 4,146,372 A | 3/1979 | Groth et al. |
| 4,169,459 A | 10/1979 | Ehrlich |
| 4,185,969 A | 1/1980 | Bulang |
| 4,201,195 A | 5/1980 | Sakhuja |
| 4,219,341 A | 8/1980 | Hussmann |
| 4,222,244 A | 9/1980 | Meckler |
| 4,234,037 A | 11/1980 | Rogers et al. |
| 4,242,112 A | 12/1980 | Jebens |
| 4,285,702 A | 8/1981 | Michel et al. |
| 4,304,577 A | 12/1981 | Ito et al. |
| 4,315,599 A | 2/1982 | Biancardi |
| 4,334,524 A | 6/1982 | McCullough |
| 4,342,569 A | 8/1982 | Hussmann |
| 4,345,917 A | 8/1982 | Hussmann |
| 4,351,651 A | 9/1982 | Courneya |
| 4,374,655 A | 2/1983 | Grodzka et al. |
| 4,377,398 A | 3/1983 | Bennett |
| 4,398,927 A | 8/1983 | Asher et al. |
| 4,405,343 A * | 9/1983 | Othmer ................ B01D 53/04 518/702 |
| 4,433,552 A | 2/1984 | Smith |
| 4,478,210 A | 10/1984 | Sieradski |
| 4,722,192 A | 2/1988 | Koblitz et al. |
| 4,726,817 A | 2/1988 | Roger |
| 5,058,388 A | 10/1991 | Shaw et al. |
| 5,275,643 A | 1/1994 | Usui |
| 5,470,484 A | 11/1995 | McNeel |
| 5,579,647 A | 12/1996 | Calton et al. |
| 5,701,749 A | 12/1997 | Zakryk |
| 5,729,981 A | 3/1998 | Markus et al. |
| 5,758,511 A | 6/1998 | Yoho et al. |
| 5,846,296 A | 12/1998 | Krumsvik |
| 5,873,256 A | 2/1999 | Denniston |
| 5,989,313 A | 11/1999 | Mize |
| 6,029,467 A | 2/2000 | Moratalla |
| 6,156,102 A | 12/2000 | Contad et al. |
| 6,199,388 B1 | 3/2001 | Fischer, Jr. |
| 6,336,957 B1 | 1/2002 | Tsymerman |
| 6,447,583 B1 | 9/2002 | Thelen et al. |
| 6,490,879 B1 | 12/2002 | Lloyd et al. |
| 6,511,525 B2 | 1/2003 | Spletzer et al. |
| 6,513,339 B1 | 2/2003 | Kopko |
| 6,557,365 B2 | 5/2003 | Dinnage et al. |
| 6,574,979 B2 | 6/2003 | Faqih |
| 6,644,060 B1 | 11/2003 | Dagan |
| 6,828,499 B2 | 12/2004 | Max |
| 6,869,464 B2 | 3/2005 | Klemic |
| 6,945,063 B2 | 9/2005 | Max |
| 6,957,543 B1 | 10/2005 | Reznik |
| 7,017,356 B2 | 3/2006 | Moffitt |
| 7,043,934 B2 | 5/2006 | Radermacher et al. |
| 7,178,355 B2 | 2/2007 | Moffitt |
| 7,251,945 B2 | 8/2007 | Tongue |
| 7,305,849 B2 | 12/2007 | Loffler et al. |
| 7,306,654 B2 | 12/2007 | King et al. |
| 7,478,535 B2 | 1/2009 | Turner, Jr. et al. |
| 7,866,176 B2 | 1/2011 | Vetrovec et al. |
| 7,905,097 B1 | 3/2011 | Fort |
| 7,926,481 B2 | 4/2011 | Edwards et al. |
| 8,075,652 B2 | 12/2011 | Melikyan |
| 8,118,912 B2 | 2/2012 | Rodriguez et al. |
| 8,196,422 B2 | 6/2012 | Ritchey |
| 8,328,904 B2 | 12/2012 | Griffiths et al. |
| 8,425,660 B2 | 4/2013 | Ike et al. |
| 8,506,675 B2 | 8/2013 | Ellsworth |
| 8,844,299 B2 | 9/2014 | Ferreira et al. |
| 9,289,718 B2 * | 3/2016 | Dahlback ............. B01D 53/261 |
| 10,357,739 B2 | 7/2019 | Friesen et al. |
| 10,469,028 B2 | 11/2019 | Friesen et al. |
| 10,632,416 B2 | 4/2020 | Friesen et al. |
| 10,835,861 B2 | 11/2020 | Friesen et al. |
| 11,159,123 B2 | 10/2021 | Friesen et al. |
| 11,160,223 B2 | 11/2021 | Friesen et al. |
| 2002/0130091 A1 | 9/2002 | Ekberg et al. |
| 2003/0091881 A1 | 5/2003 | Eisler |
| 2003/0101161 A1 | 5/2003 | Ferguson et al. |
| 2004/0000165 A1 | 1/2004 | Max |
| 2004/0055309 A1 | 3/2004 | Bellows et al. |
| 2005/0044862 A1 | 3/2005 | Vetrovec et al. |
| 2005/0084415 A1 | 4/2005 | McVey et al. |
| 2005/0204914 A1 | 9/2005 | Boutall |
| 2005/0249631 A1 | 11/2005 | Schulz et al. |
| 2005/0284167 A1 | 12/2005 | Morgan |
| 2006/0017740 A1 | 1/2006 | Coleman |
| 2006/0032493 A1 | 2/2006 | Ritchey |
| 2006/0112709 A1 | 6/2006 | Boyle |
| 2006/0130654 A1 | 6/2006 | King et al. |
| 2006/0288709 A1 | 12/2006 | Reidy |
| 2007/0028769 A1 | 2/2007 | Eplee et al. |
| 2007/0101862 A1 | 5/2007 | Tongue |
| 2007/0150424 A1 | 6/2007 | Igelnik |
| 2007/0274858 A1 | 11/2007 | Childers et al. |
| 2007/0295021 A1 | 12/2007 | Tyls et al. |
| 2008/0135495 A1 | 6/2008 | Sher |
| 2008/0168789 A1 * | 7/2008 | Jones ................ F24S 50/20 62/291 |
| 2008/0202944 A1 | 8/2008 | Santoli et al. |
| 2008/0224652 A1 | 9/2008 | Zhu et al. |
| 2008/0289352 A1 | 11/2008 | Parent |
| 2009/0025711 A1 | 1/2009 | Edwards et al. |
| 2009/0093916 A1 | 4/2009 | Parsonnet et al. |
| 2009/0211276 A1 | 8/2009 | Forkosh |
| 2009/0223514 A1 | 9/2009 | Smith et al. |
| 2010/0083673 A1 | 4/2010 | Meritt |
| 2010/0170499 A1 | 7/2010 | Bar |
| 2010/0192605 A1 | 8/2010 | Fang et al. |
| 2010/0212348 A1 | 8/2010 | Oh |
| 2010/0275629 A1 | 11/2010 | Erickson |
| 2010/0275775 A1 | 11/2010 | Griffiths et al. |
| 2010/0294672 A1 | 11/2010 | Gahr et al. |
| 2011/0048039 A1 | 3/2011 | Kohavi et al. |
| 2011/0056220 A1 | 3/2011 | Caggiano |
| 2011/0083458 A1 | 4/2011 | Takakura et al. |
| 2011/0132027 A1 | 6/2011 | Gommed et al. |
| 2011/0232485 A1 | 9/2011 | Ellsworth |
| 2011/0247353 A1 | 10/2011 | Metz |
| 2011/0296858 A1 | 12/2011 | Caggiano |
| 2012/0006193 A1 * | 1/2012 | Roychoudhury .... B01D 53/047 95/11 |
| 2012/0125020 A1 | 5/2012 | Vandermeulen et al. |

(56) References Cited

U.S. PATENT DOCUMENTS

| | | |
|---|---|---|
| 2012/0227582 A1 | 9/2012 | Wamstad et al. |
| 2013/0227879 A1 | 9/2013 | Lehky |
| 2013/0269522 A1 | 10/2013 | DeValve |
| 2013/0312451 A1 | 11/2013 | Max |
| 2013/0318790 A1 | 12/2013 | Becze et al. |
| 2013/0319022 A1* | 12/2013 | Becze .................. B01D 53/18 62/94 |
| 2014/0034475 A1 | 2/2014 | Kamen et al. |
| 2014/0138236 A1 | 5/2014 | White |
| 2014/0157985 A1 | 6/2014 | Scovazzo et al. |
| 2014/0173769 A1 | 6/2014 | Leyns et al. |
| 2014/0317029 A1 | 10/2014 | Matsuoka et al. |
| 2015/0033774 A1 | 2/2015 | Ferreira et al. |
| 2015/0194926 A1 | 7/2015 | Bushong, Jr. |
| 2016/0073589 A1 | 3/2016 | McNamara |
| 2016/0101387 A1* | 4/2016 | Pedace .................. F24F 3/1411 95/26 |
| 2016/0131401 A1 | 5/2016 | Otanicar et al. |
| 2016/0162456 A1 | 6/2016 | Munro et al. |
| 2016/0187287 A1 | 6/2016 | Tajiri et al. |
| 2016/0197364 A1 | 7/2016 | Rama |
| 2016/0244951 A1 | 8/2016 | Yui |
| 2016/0333553 A1 | 11/2016 | Dorfman |
| 2017/0013810 A1 | 1/2017 | Grabell |
| 2017/0024641 A1 | 1/2017 | Wierzynski |
| 2017/0323221 A1 | 11/2017 | Chaudhuri et al. |
| 2017/0354920 A1* | 12/2017 | Switzer .................. B01D 53/06 |
| 2017/0371544 A1 | 12/2017 | Choi et al. |
| 2018/0043295 A1 | 2/2018 | Friesen et al. |
| 2019/0025273 A1 | 1/2019 | Brondum |
| 2019/0102695 A1 | 4/2019 | Biswas et al. |
| 2019/0171967 A1 | 6/2019 | Friesen et al. |
| 2019/0254243 A1 | 8/2019 | Friesen et al. |
| 2019/0336907 A1 | 11/2019 | Friesen et al. |
| 2019/0344214 A1 | 11/2019 | Friesen et al. |
| 2020/0122083 A1 | 4/2020 | Friesen et al. |
| 2020/0124566 A1 | 4/2020 | Johnson et al. |
| 2020/0140299 A1 | 5/2020 | Friesen et al. |
| 2020/0209190 A1 | 7/2020 | Johnson et al. |
| 2020/0269184 A1 | 8/2020 | Friesen et al. |
| 2020/0283997 A1 | 9/2020 | Salloum et al. |
| 2020/0300128 A1 | 9/2020 | Friesen et al. |
| 2021/0062478 A1 | 3/2021 | Friesen et al. |
| 2021/0305935 A1 | 9/2021 | Friesen et al. |

FOREIGN PATENT DOCUMENTS

| | | |
|---|---|---|
| CN | 101589282 | 11/2009 |
| CN | 102042645 | 5/2011 |
| CN | 102297503 | 12/2011 |
| CN | 102422089 | 4/2012 |
| CN | 102441320 | 5/2012 |
| CN | 102733451 | 10/2012 |
| CN | 202850099 | 4/2013 |
| CN | 103889892 | 6/2014 |
| CN | 203777907 | 8/2014 |
| CN | 104813107 | 7/2015 |
| CN | 204510348 U | 7/2015 |
| CN | 105531547 | 4/2016 |
| EP | 1139554 | 10/2001 |
| EP | 2305362 | 4/2011 |
| EP | 2326890 | 6/2011 |
| FR | 2813087 | 2/2002 |
| JP | H06142434 | 5/1994 |
| JP | 2012101169 | 5/2012 |
| WO | 1999007951 | 2/1999 |
| WO | WO9907951 A1 * | 2/1999 ................ C02F 1/18 |
| WO | 2006129200 | 12/2006 |
| WO | 2007041804 | 4/2007 |
| WO | 2007051886 | 5/2007 |
| WO | 2008018071 | 2/2008 |
| WO | 2009043413 | 4/2009 |
| WO | 2012009024 | 1/2012 |
| WO | 2012128619 | 9/2012 |
| WO | 2012162760 | 12/2012 |
| WO | 2013026126 | 2/2013 |
| WO | 2013182911 | 12/2013 |
| WO | 2014085860 | 6/2014 |
| WO | 2015054435 | 4/2015 |
| WO | 2016053162 | 4/2016 |
| WO | 2016081863 | 5/2016 |
| WO | 2016138075 | 9/2016 |
| WO | 2016187709 | 12/2016 |
| WO | 2017177143 | 10/2017 |
| WO | 2017201405 | 11/2017 |
| WO | 2019014599 | 1/2019 |
| WO | 2019050861 | 3/2019 |
| WO | 2019050866 | 3/2019 |
| WO | 2019071202 | 4/2019 |
| WO | 2019113354 | 6/2019 |
| WO | 2019161339 | 8/2019 |
| WO | 2020082038 | 4/2020 |
| WO | 2020086621 | 4/2020 |
| WO | 2021154739 | 8/2021 |

OTHER PUBLICATIONS

PV Performance Modeling Collaborative. (2014). Irradiance & Insolation. Accessed Aug. 18, 2021 at https://pvpmc.sandia.gov/modeling-steps/1-weather-design-inputs/irradiance-and-insolation-2/ (Year: 2014).*

ACS. (2012). A Single-Layer Atmosphere Model. Accessed on Aug. 17, 2021 at https://www.acs.org/content/acs/en/climatescience/atmosphericwarming/singlelayermodel.html (Year: 2012).*

Materials Technology. (2010). UV Exposure Across Surface of Earth. Accessed Aug. 17, 2021 at http://www.drb-mattech.co.uk/uv%20map.html (Year: 2010).*

Final Office Action dated Apr. 13, 2021 in U.S. Appl. No. 16/167,295.

Non-Final Office Action dated Apr. 30, 2021 in U.S. Appl. No. 16/278,608.

International Search Report and Written Opinion dated Apr. 6, 2021 in Application No. PCT/US2021/015106.

Office Action dated Apr. 6, 2021 in Chinese Application No. 201780033378.3.

Office Action dated Apr. 28, 2021 in India Patent Application No. 20181704169.

Office Action dated May 18, 2021 in Philippines Application No. 1/2020/500092.

Final Office Action dated Oct. 15, 2020 in U.S. Appl. No. 16/791,895.

Final Office Action dated Apr. 27, 2020 in U.S. Appl. No. 15/528,366.

Non-Final Office Action dated Jun. 1, 2020 in U.S. Appl. No. 16/167,295.

Non-Final Office Action dated May 15, 2020 in U.S. Appl. No. 16/791,895.

International Search Report and Written Opinion dated Mar. 19, 2020 in Application No. PCT/US2019/057081.

USPTO, Notice of Allowance dated Jun. 19, 2020 in U.S. Appl. No. 15/528,366.

International Search Report and Written Opinion dated Jun. 15, 2020 in Application No. PCT/US2020/029401.

Notice of Allowance dated Jun. 3, 2019 in U.S. Appl. No. 15/600,046.

Non-Final Office Action dated Feb. 5, 2019 in U.S. Appl. No. 15/482,104.

Notice of Allowance dated Jun. 27, 2019 in U.S. Appl. No. 15/482,104.

Non-Final Office Action dated Aug. 9, 2019 in U.S. Appl. No. 16/517,435.

International Search Report and Written Opinion dated Apr. 29, 2016 in Application No. PCT/US2015/061921.

International Search Report and Written Opinion in Aug. 16, 2017 in Application No. PCT/US2017/033540.

International Search Report and Written Opinion dated Jun. 19, 2017 in Application No. PCT/US2017/026609.

International Search Report and Written Opinion dated Dec. 3, 2018 in Application No. PCT/US2018/049411.

International Search Report and Written Opinion dated Dec. 3, 2018. Application No. PCT/US2018/049398.

(56) References Cited

OTHER PUBLICATIONS

International Search Report and Written Opinion dated Jan. 15, 2019 in Application No. PCT/US2018/054715.
International Search Report and Written Opinion dated Mar. 6, 2019 in Application No. PCT/US2018/042098.
International Search Report and Written Opinion dated Mar. 29, 2019 in Application No. PCT/US2018/064308.
International Search Report and Written Opinion dated Jun. 6, 2019 in Application No. PCT/US2019/018431.
International Search Report and Written Opinion dated Jul. 29, 2019 in Application No. PCT/US2019/32066.
European Search Report dated Jun. 7, 2019 in Application No. 15825979.
Office Action dated Oct. 31, 2019 in Chinese Application No. 201780033378.3.
Ali et al., "Desiccant Enhanced Nocturnal Radiative Cooling-Solar Collector System for Air Comfort Application in Hot Arid Areas," Int. J. of Thermal & Environmental Engineering, vol. 5, No. 1, pp. 71-82 (2013).
Anand et al., "Solar Cooling Systems for Climate Change Mitigation: A Review," Renewable and Sustainable Energy Reviews, vol. 41, pp. 143-161 (2015).
De Antonellis et al., "Simulation, Performance Analysis and Optimization of Desiccant Wheels," Energy and Buildings, vol. 42, No. 9, pp. 1386-1393 (2010).
Eriksson et al., "Diurnal Variations of Humidity and Ice Water Content in the Tropical Upper Troposphere," Atmos. Chem. Phys. vol. 10, pp. 11519-11533 (2010).
European Solar Thermal Industry Federation (ESTIF), "Key Issues for Renewable Heat in Europe (K4RES-H)," Solar Assisted Cooling—WP3, Task 3.5, Contract EIE/04/204/S07.38607, pp. 1-21 (2006).
Ge et al., "A Mathematical Model for Predicting the Performance of a Compound Desiccant Wheel (A Model of a Compound Desiccant Wheel)," Applied Thermal Engineering, vol. 30, No. 8, pp. 1005-1015 (2010).
Kassem et al., "Solar Powered Dehumidification Systems Using Desert Evaporative Coolers: Review," International Journal of Engineering and Advanced Technology {IJEAT}, ISSN: 2249-8958, vol. 3, Issue 1 (2013).
Kolewar et al., "Feasability of Solar Desiccant Evaporative Cooling: A Review," International Journal of Scientific & Engineering Research, ISSN: 2229-5518, vol. 5, Issue 10 (2014).
La et al., "Technical Development of Rotary Desiccant Dehumidification and Air Conditioning: A Review," Renewable and Sustainable Energy Reviews, vol. 14, pp. 130-147 (2010).
Nia et al., "Modeling and Simulation of Desiccant Wheel for Air Conditioning," Energy and Buildings, vol. 38, No. 10, pp. 1230-1239 (2006).
Kozubal et al.,"Desiccant Enhanced Evaporative Air-Conditioning {DEVap}: Evaluation of a New Concept in Ultra Efficient Air Conditioning," National Renewal Energy Laboratory {NREL}, Technical Report, NREL/TP-5500-49722 (2011).
Critoph et al., "Solar Energy for Cooling and Refrigeration," Engineering Department, University of Warwick, Coventry CV4 7AL, United Kingdom (1997).
Wahlgren, "Atmospheric Water Vapour Processor Designs for Potable Water Production: A Review," Wat. Res., vol. 35, No. 1, pp. 1-22 (2001).
Gad et al., "Application of a Solar Desiccant/Collector System for Water Recovery From Atmospheric Air," Renewal Energy, vol. 22, No. 4, pp. 541-556 (2001).
William et al., "Desiccant System for Water Production From Humid Air Using Solar Energy," Energy, vol. 90, pp. 1707-1720 (2015).
Non-Final Office Action dated Jul. 20, 2021 in U.S. Appl. No. 16/211,896.
Non-Final Office Action dated Jul. 26, 2021 in U.S. Appl. No. 16/630,824.
Non-Final Office Action dated Aug. 24, 2021 in U.S. Appl. No. 16/657,935.
Office Action dated Jul. 15, 2021 in Japanese Patent Application No. 2019-503636.
Office Action dated Aug. 4, 2021 in Chinese Application No. 201780033378.3.
PV Performance Modeling Collaborative. Irradiance & Insolation. Accessed Aug. 18, 2021 at https://pvpmc.sandia.gov/modeling-steps/1-weather-design-inputs/irradiance-and-insolation-2/ (2014).
ACS. A Single-Layer Atmosphere Model. Accessed on Aug. 17, 2021 at https://www.acs.org/content/acs/en/ climatescience/atmosphericwarming/singlelayermodel.html (2012).
Materials Technology. UV Exposure Across Surface of Earth. Accessed Aug. 17, 2021 at http://www.drb-mattech.co.uk/uv %20map.html (2010).
Notice of Allowance dated Oct. 20, 2021 in U.S. Appl. No. 16/820,587.
Notice of Allowance dated Nov. 10, 2021 in U.S. Appl. No. 16/211,896.
Final Office Action dated Dec. 20, 2021 in U.S. Appl. No. 16/791,895.
Office Action dated Nov. 1, 2021 in Chinese Application No. 201780033378.3.
Office Action dated Oct. 20, 2021 in Chinese Patent Application No. 201780044144.9.

* cited by examiner

300

SYSTEMS AND METHODS FOR GENERATING LIQUID WATER USING HIGHLY EFFICIENT TECHNIQUES THAT OPTIMIZE PRODUCTION

CROSS-REFERENCE TO RELATED APPLICATIONS

This application claims the benefit of priority to U.S. Provisional Patent Application No. 62/748,285, titled SYSTEMS AND METHODS FOR GENERATING LIQUID WATER filed Oct. 19, 2018, and U.S. Provisional Patent Application No. 62/772,393, tilted SYSTEMS AND METHODS FOR GENERATING LIQUID WATER USING HIGHLY EFFICIENT TECHNIQUES THAT OPTIMIZE PRODUCTION filed Nov. 28, 2018, each of which is incorporated herein by reference in its entirety.

BACKGROUND

Producing liquid water by extracting water vapor from ambient air or atmospheric air can present various challenges. Certain challenges include those associated with maximizing a water production rate and/or efficiency at a low cost and high reliability. There exists a need for improved systems and methods for producing liquid water from ambient air or atmospheric air using an inexpensive and reliable approach that maximizes the water production rate and/or efficiency.

SUMMARY

As disclosed herein, a system for producing liquid water from a process gas may comprise a sealable housing defining an interior volume, the sealable housing comprising a process gas inlet configured to input the process gas into the interior volume during a load time, a hygroscopic material retained within the interior volume, wherein the hygroscopic material is configured to capture water vapor from the process gas during the load time, and wherein the hygroscopic material is configured to absorb thermal energy during a release time, and a means for producing a reduced pressure condition within the interior volume during the release time, wherein the reduced pressure condition is characterized by a reduction of the partial pressure of water vapor within the interior volume to below a vapor pressure of water captured by the hygroscopic material during the load time.

In various embodiments, the system further comprises a condenser unit operatively coupled to the interior volume and configured to condense water vapor from the interior volume into liquid water during the release time. In various embodiments, the carrier gas comprises ambient air. In various embodiments, the system further comprises a heater disposed in the interior volume, wherein the heater is configured to provide thermal energy to the hygroscopic material during the release time, and wherein the producing the reduced pressure condition comprises actuating the heater. In various embodiments, a surface of the sealable housing comprises a solar absorbance of at least 90%. In various embodiments, the system further comprises an energy generation device configured to generate power from solar energy, and an energy storage device configured to store energy generated by the energy generation device. In various embodiments, the means for producing the reduced pressure condition comprises one or more of: a carrier gas inlet configured to input a carrier gas into the interior volume, and a pump configured to evacuate the interior volume. In various embodiments, the process gas inlet and the carrier gas inlet are the same inlet.

In various embodiments, the system further comprises one or more sensors, and a controller coupled to the one or more sensors, the pump, and the carrier gas inlet, wherein the controller is configured to maximize the liquid water production rate in the condenser by adjusting the reduced pressure condition during the release time. In various embodiments, adjusting the reduced pressure condition comprises adjusting one or more of: a pump rate at which the pump evacuates the interior volume, and a flow rate at which the carrier gas is input into the interior volume. In various embodiments, the one or more sensors generate a signal relating to one or more of: ambient temperature, ambient pressure, ambient relative humidity, solar flux, weather forecast, time of day, interior volume temperature, interior volume pressure, interior volume relative humidity, interior volume water vapor partial pressure, pump discharge temperature, pump discharge pressure, condenser discharge temperature, liquid water production rate, liquid water production volume, and liquid water quality. In various embodiments, the system further comprises a process gas inlet valve and a carrier gas inlet valve for sealing the sealable housing and, wherein maximizing the liquid water production rate further comprises opening the process gas inlet valve and closing the carrier gas inlet valve during the load time, and closing the process gas inlet valve and opening the carrier gas inlet valve during the release time. In various embodiments, maximizing the liquid water production rate further comprises opening the process gas inlet valve and closing the carrier gas inlet valve during the nighttime, and closing the process gas inlet valve and opening the carrier gas inlet valve during the daytime, according to a to a diurnal cycle.

As disclosed herein, a method for producing liquid water from a process gas may comprise inputting the process gas into an interior volume defined by a sealable housing during a load time, wherein a hygroscopic material retained within the interior volume is configured to capture water vapor from the process gas during the load time, forming a reduced pressure condition within the interior volume during a release time by increasing a ratio of vapor pressure of water captured by the hygroscopic material to water vapor partial pressure in the interior volume, exposing the hygroscopic material to a thermal energy source during the release time, wherein the hygroscopic material is configured to absorb the thermal energy during the release time, and communicating a water vapor output from the interior volume during the release time.

In various embodiments, the method further comprises condensing, by a condenser unit, water vapor output from the interior volume into liquid water during the release time, and repeating at least one of the inputting, the forming, the exposing, the outputting, and the condensing until a desired volume of liquid water is reached. In various embodiments, the thermal energy source comprises solar radiation, and wherein the solar radiation is transmitted through the sealable housing. In various embodiments, the load time is a first time duration corresponding to a nighttime environmental condition, wherein the release time is a second time duration corresponding to a daytime environmental condition, and wherein the load time and the release time occur in an alternating manner according to a diurnal cycle. In various embodiments, the load time is a first time duration corresponding to a first environmental condition, measured or forecasted, having a relative humidity greater than 30% and a solar insolation less than 250 W/m$^2$, and wherein the release time is a second time duration corresponding to a second environmental condition, measured or forecasted, having a solar insolation greater than 250 W/m².

In various embodiments, the thermal energy source comprises waste heat generated from industrial or residential heat waste. In various embodiments, the forming the reduced pressure condition further comprises increasing a ratio of vapor pressure of water captured by the hygroscopic material to a total pressure of gases in the interior volume. In various embodiments, the forming the reduced pressure condition further comprises retaining a pressure in the interior volume below the atmospheric pressure surrounding the sealable housing such that the water vapor captured by the hygroscopic material during the load time approaches vapor pressure saturation. In various embodiments, a pump is operatively coupled to the interior volume, and wherein the forming the reduced pressure condition comprises one or more of: inputting a carrier gas into the interior volume during the release time, and activating the pump to evacuate the interior volume during the release time. In various embodiments, the carrier gas comprises ambient air.

In various embodiments, the method further comprises heating the carrier gas with a thermal energy source. In various embodiments, the heating the carrier gas comprises transferring heat from the water vapor output to the carrier gas via a heat exchanger during the release time, thereby promoting cooling and condensation of the water vapor output and conversely heating and drying of the carrier gas. In various embodiments, a controller is configured to control one or more of: a flow rate of the carrier gas into the interior volume, and a pump rate of the pump.

In various embodiments, the controller communicates with one or more sensors, wherein the one or more sensors are configured to detect one or more of: the pressure of gases in the interior volume, the temperature within the interior volume, the temperature of the carrier gas, the ambient temperature, the time of day, weather forecast, solar flux, the relative humidity of the carrier gas, the relative humidity of the ambient air during the load time, the temperature of the water vapor output the flow rate of the water vapor output, a water vapor partial pressure within the interior volume, a water vapor partial pressure output from the interior volume, a water production rate, and a water production volume. In various embodiments, the controller employs an algorithm to determine optimal control conditions for one or more of: the flow rate of the carrier gas into the interior volume, and the pump rate of the pump, as a function of one or more of: the pressure of gases in the interior volume, the temperature within the interior volume, the temperature of the carrier gas, the ambient temperature, the time of day, weather forecast, solar flux, the relative humidity of the carrier gas, the relative humidity of the ambient air during the load time, the temperature of the water vapor output the flow rate of the water vapor output, a water vapor partial pressure within the interior volume, a water vapor partial pressure output from the interior volume, a water production rate, and a water production volume. In various embodiments, the reduced pressure condition is a pressure below 0.5 atm.

As disclosed herein, a system may comprise a sealable housing defining an interior volume, the sealable housing comprising a process gas inlet configured to input the process gas into the interior volume during a load time, and a hygroscopic material retained within the interior volume, wherein the hygroscopic material is configured to capture water vapor from the process gas during the load time, and wherein the hygroscopic material is configured to absorb thermal energy during a release time, wherein the sealable housing is configured to enable a reduced pressure condition within the interior volume during the release time, and wherein the reduced pressure condition is characterized by a reduction of the partial pressure of water vapor within the interior volume to below a vapor pressure of water captured by the hygroscopic material during the load time.

In various embodiments, the system further comprises a pump configured to evacuate the interior volume. In various embodiments, the system further comprises a carrier gas inlet configured to input a carrier gas into the interior volume. In various embodiments, the carrier gas inlet and the process gas inlet comprise the same inlet.

These and other aspects of the present disclosure will become apparent upon reference to the following detailed description and attached drawings. All references disclosed herein are hereby incorporated by reference in their entireties as if each was incorporated individually.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the following drawings, which illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. Views in the figures are drawn to scale (unless otherwise noted), meaning the sizes of the depicted elements are accurate relative to each other for at least the embodiment in the view.

DETAILED DESCRIPTION

Figure 1:
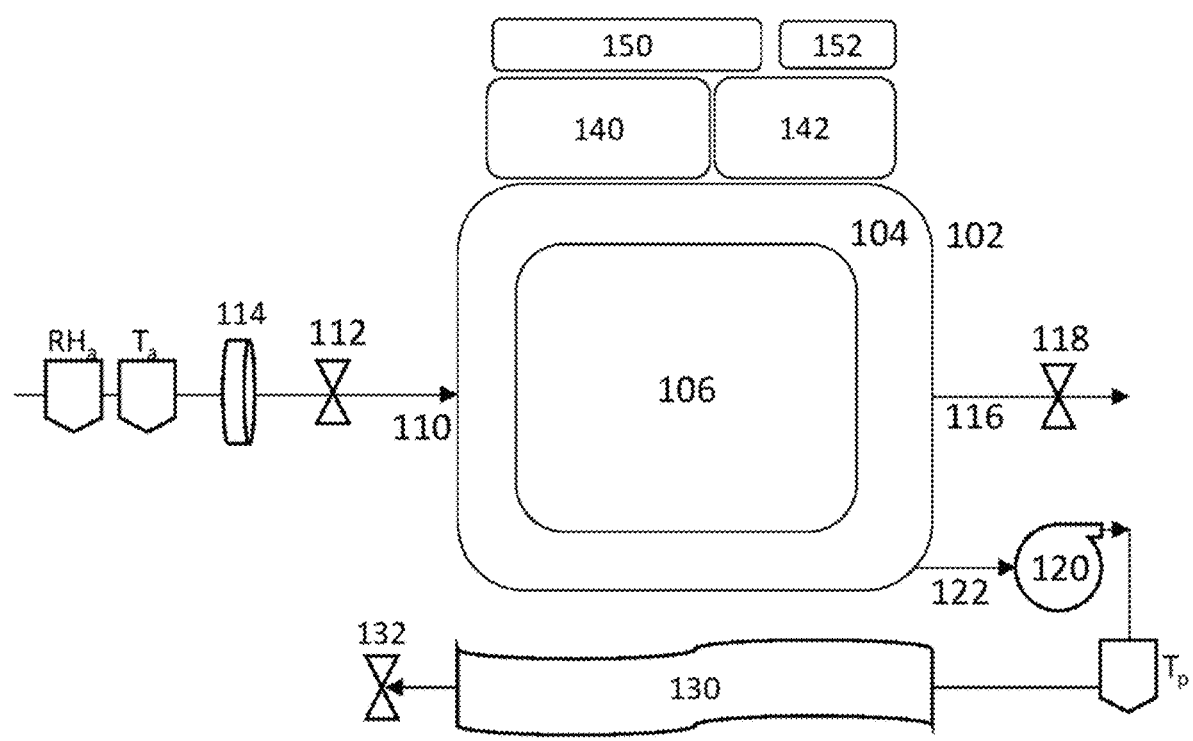
FIG. 1 illustrates a representative diagram of a system for managing production and distribution of liquid water extracted from ambient air, according to an embodiment.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure.

Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Surface shading lines may be used throughout the figures to denote different parts but not necessarily to denote the same or different materials.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together, but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time (e.g., permanent or semi-permanent or only for an instant).

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

As used herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As used herein, a "load time" or "load cycle" means a period of time during which a hygroscopic material retained within a sealable housing is exposed to a process gas under conditions suitable to facilitate capture of water vapor therefrom. As used herein, "release time" or "release cycle" means a period of time during which the conditions applied to a hygroscopic material retained within a sealable housing facilitate the release of water vapor from the hygroscopic material.

Described herein are systems and methods for generating liquid water from ambient moisture that include a hygroscopic material that is operated under process conditions that facilitate capturing atmospheric water vapor and releasing liquid water.

A high efficiency thermodynamic system purposed with generating liquid water from ambient moisture is described. Ambient atmospheric water vapor may be captured on a hygroscopic material or set of materials. This hygroscopic capture may separate the water vapor from the process gas (for example, the atmosphere and/or source of gas introduced to the hygroscopic material) and may concentrate the water vapor in a condensed, adsorbed, and/or absorbed form therewith. The now moisture-laden hygroscopic material may then be brought under a reduced pressure condition, substantially removing the atmosphere surrounding the moisture-laden hygroscopic material. Alternatively or additionally, the hygroscopic material may then be brought under a reduced partial pressure condition by introduction of another gas. As used herein, the phrases reduced pressure condition and reduced partial pressure condition are used interchangeably. Directed energy, in the form of photons, electromagnetic radiation, conduction, acoustic energy or other schema may then be employed to introduce thermal power to the moisture laden hygroscopic materials under reduced pressure, thereby causing water vapor formation and/or elevating the equilibrium partial pressure of water vapor over the water there disposed.

A mechanism for retaining the pressure below that of the pressure at which the hygroscopic material was exposed to the atmospheric water vapor can be employed. As a mechanism of altering the thermodynamic conditions within the vessel in which the hygroscopic materials are disposed, additional gases (from the atmosphere or elsewhere) can be introduced. The material-respired water vapor and introduced-gas mixture can then be elevated in pressure to create a thermodynamic condition that results in the phase change of the water vapor into liquid water.

As disclosed herein, any one of more of the following can be optimized: the properties of the hygroscopic materials, the ability of those materials to absorb radiation and/or conduct thermal energy, the reduced pressure condition and/or mechanisms for creating it, the temporal dynamics of the reduced pressure condition, the nature and/or extent of additional gas introduction, throttling of radiation and/or other thermal energy transfer mechanisms, the quality and/or composition of the liquid water and/or its content. Where possible, any one of more of the foregoing may be dynamically controlled by a control system in order to maximize the production of liquid water from the thermodynamic system. The control system can use a set of sensors, an onboard deterministic and/or machine learning algorithm, information regarding the thermodynamics of water vapor, information regarding the properties of the hygroscopic materials, information regarding the amount of liquid water produced, and/or other factors that are synthesized in the controller in order to optimize water production.

Referring to the drawings, and more particularly to FIG. 1, shown therein is a water generating system 100 for generating liquid water from a process gas, for example, ambient air. In various embodiments, the process gas can comprise any suitable source of gas capable of carrying water vapor. In various embodiments, water generating system 100 comprises a sealable housing 102 defining an interior volume 104. A hygroscopic material 106 is retained within the interior volume 104.

In various embodiments, hygroscopic material 106 is a desiccant. In various embodiments, hygroscopic material 106 is retained within the interior volume 104 and is configured to capture water vapor from the process gas, for example, during a load time or cycle. Hygroscopic material 106 may capture water vapor via one or more of absorption processes, adsorption processes, condensation processes, or a combination of any of the foregoing. Sealable housing 102 may comprise an inlet 110 for inputting the process gas into interior volume 104. In various embodiments, the process gas is provided at a substantially ambient pressure. However, the process gas may be provided pressure suitable for use in water generating system 100. The term "substantially," as used herein, is intended to encompass minor deviations rather than define an exact value.

In various embodiments, inlet 110 comprises a valve 112 or other flow management device that is configured to allow communication of the process gas into interior volume 104, for example during the load time, and/or to be sealed or otherwise closed at other times so as to prevent communication of the process gas into interior volume 104. In various embodiments, valve 112 is open during all or substantially all of the load time. In various embodiments, valve 112 may be optionally opened and closed during the release time, as more fully described below. In various embodiments, water generating system 100 further comprises a blower or fan 114 to increase, decrease, control, and/or adjust the flow rate of the process gas into interior volume 104. In various embodiments, the process gas may be characterized by an ambient temperature Ta and/or an ambient relative humidity $RH_a$.

In various embodiments, sealable housing 102 further comprises an outlet 116 and associated valve 118. Outlet 116 may be configured for outputting process gas from interior volume 104 (for example, during a load time or load cycle). Valve 118 may be operatively coupled to outlet 116 and configured to allow communication of the process gas out of interior volume 104 through outlet 116 and/or to be sealed or otherwise closed so as to prevent communication of the process gas through outlet 116 and out of interior volume 104. Valve 118 may be configured to be open during the load time. In various embodiments, valve 118 is open during all or substantially all of the load time and is closed during all or substantially all of the release time.

In various embodiments, hygroscopic material 106 is comprised of hygroscopic or desiccant particles disposed in interior volume 104. Hygroscopic material 106 may be packed into interior volume 104 so as to maximize surface area for interaction with a process gas or other water-laden fluid. For example, hygroscopic particles may be agglomerated via a binder and/or dispersed in a high surface area matrix or support medium. In various embodiments, hygroscopic material 106 and/or a support medium (if present) are selected to minimize reflection of solar radiation and/or improve absorption and/or conduction of thermal energy. For example, in various embodiments, hygroscopic material 106 and/or a support medium (if present) are dark or black in color. In some embodiments, hygroscopic material 106 is mixed, combined, or used in conjunction with materials and/or structures to increase absorption and/or transfer of heat. In other embodiments, hygroscopic material 106 is a self-supporting structure essentially becoming and/or substantially filling the interior volume 104.

Hygroscopic material 106 may comprise a sorption medium or desiccant. Hygroscopic material 106 can comprise any desirable medium in any desirable configuration (e.g., such that the hygroscopic material is capable of adsorption and desorption of water). The following description of hygroscopic materials and sorption mediums is provided only by way of example. In various embodiments, hygroscopic material 106 is capable of sorption at a first temperature and/or pressure, and desorption at a second temperature and/or pressure. The term "sorption," as used herein, refers to absorption, adsorption, or a combination thereof. Hygroscopic material 106 can be provided as a liquid, solid, or combinations thereof. In various embodiments, hygroscopic material 106 is a porous solid impregnated with hygroscopic materials. For example, hygroscopic material 106 may comprise one or more materials selected from the group consisting of: silica, silica gel, alumina, alumina gel, montmorillonite clay, zeolites, molecular sieves, metal-organic frameworks, activated carbon, metal oxides, lithium salts, calcium salts, potassium salts, sodium salts, magnesium salts, phosphoric salts, organic salts, metal salts, glycerin, glycols, hydrophilic polymers, polyols, polypropylene fibers, cellulosic fibers, derivatives thereof, and combinations of thereof.

In various embodiments, hygroscopic material 106 exhibits high isothermal behavior across a relative humidity in the range of about 10-100% (wherein about means +/−5%). In various embodiments, hygroscopic material 106 exhibits a water vapor mass uptake of at least about 8%, at least about 9%, or at least about 10% of material mass (wherein about means +/−1%). In various embodiments, hygroscopic material 106 exhibits a water vapor mass uptake greater than 10% of material mass. In various embodiments, hygroscopic material 106 exhibits a high absorbance to solar radiation. In various embodiments, hygroscopic material 106 exhibits a high thermal conductivity. In various embodiments, hygroscopic material 106 exhibits a high emissivity.

In various embodiments, hygroscopic material 106 is selected and/or configured to avoid sorption of certain molecules (e.g., those molecules that may be poisonous or otherwise harmful when consumed by a human or other organism). Various approaches can be employed to control water quality, for example, such as those that are described in International Patent Application No. PCT/US18/42098 filed Jul. 13, 2018 which is entitled "SYSTEMS FOR CONTROLLED TREATMENT OF WATER WITH OZONE AND RELATED METHODS THEREFOR." The content of the aforementioned application is incorporated herein by reference in its entirety.

In various embodiments, sealable housing 102 is configured to facilitate efficient interaction with the surrounding environment. For example, in various embodiments, sealable housing 102 is as a generally planar vessel with a top surface having a surface area configured to facilitate heat and energy capture and transfer when exposed to the ambient environment. In various embodiments, the size and/or shape of sealable housing 102 is configured to maximize heat transfer to hygroscopic material 106. In various embodiments, the hygroscopic material 106 retained within sealable housing 102 is configured to efficiently transfer heat to and/or through the sealable housing 102 during a load time. In various embodiments, the hygroscopic material 106 is configured to accept heat from and/or through the sealable housing 102 during a release time. In various embodiments, the size and location of one or more of inlet 110, outlet 116 and/or other structural elements of water generating system 100 is configured to optimize the characteristics (e.g., humidity, temperature, etc.) of fluids communicated into or out of interior volume 104. In various embodiments, one or more of valves 112, 118 and 132 and/or other structural elements of water generating system 100 are protected from solar exposure, for example by a protective covering. In various embodiments, one or more of valves 112, 118 and 132 and/or other structural elements of water generating system 100 are located behind elements of water generating system 100 that are configured to facilitate heat and energy capture (e.g., sealable housing 102 and/or solar power unit 140, hereinafter described), and are therefore protected to some degree from solar radiation.

Figure 2:
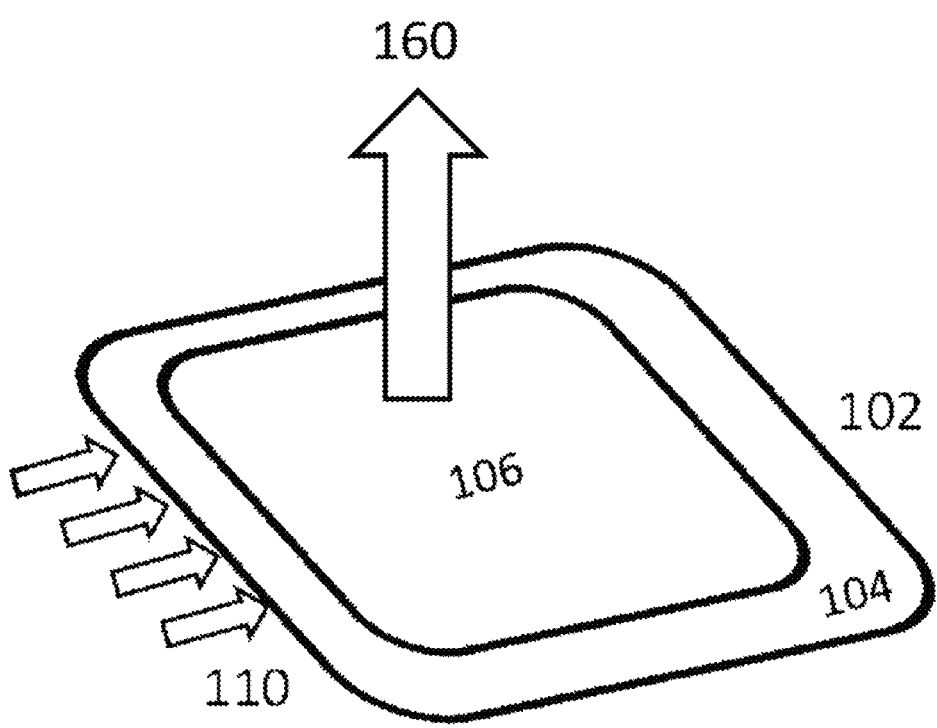
FIG. 2 illustrates operation of a system during a load time, according to an embodiment.

During a load time or load cycle, such as depicted in FIG. 2, hygroscopic material 106 retained within interior volume 104 may capture water vapor from a process gas that is communicated through inlet 110 into interior volume 104. In various embodiments, during the load time, sealable housing 102 is exposed to an ambient environment that may cool the hygroscopic material 106 via radiative, convective, and/or conductive heat transfer mechanisms for transferring heat 160 away from hygroscopic material 106 (e.g. during a nighttime or low temperature ambient condition). In various embodiments, the load time corresponds to an environmental condition, whether measured and/or forecasted, having a relative humidity of at least about 25%, at least about 26%, at least about 27%, at least 2 about 8%, at least about 29%, or at least about 30% (wherein about means +/−5%). In various embodiments, the load time corresponds to an environmental condition, whether measured and/or forecasted, having a solar insolation of no greater than about 350 W/m$^2$, no greater than about 325 W/m$^2$, no greater than about 300 W/m$^2$, or no greater than about 275 W/m$^2$ (wherein about means +/−25 W/m$^2$) In various embodiments, the load time corresponds to an environmental condition, whether measured and/or forecasted, having a relative humidity greater than 30% and/or a solar insolation less than 250 W/m$^2$.

Without wishing to be bound by any particular theory, the sealable housing and hygroscopic material may be configured to reject the heat of adsorption and/or absorption associated with the capture of water vapor on or by the hygroscopic material 106 via exposure to the night sky, excess air flow, vapor-compression based cooling, Peltier cooling and/or derivatives or combinations thereof.

Figure 3:
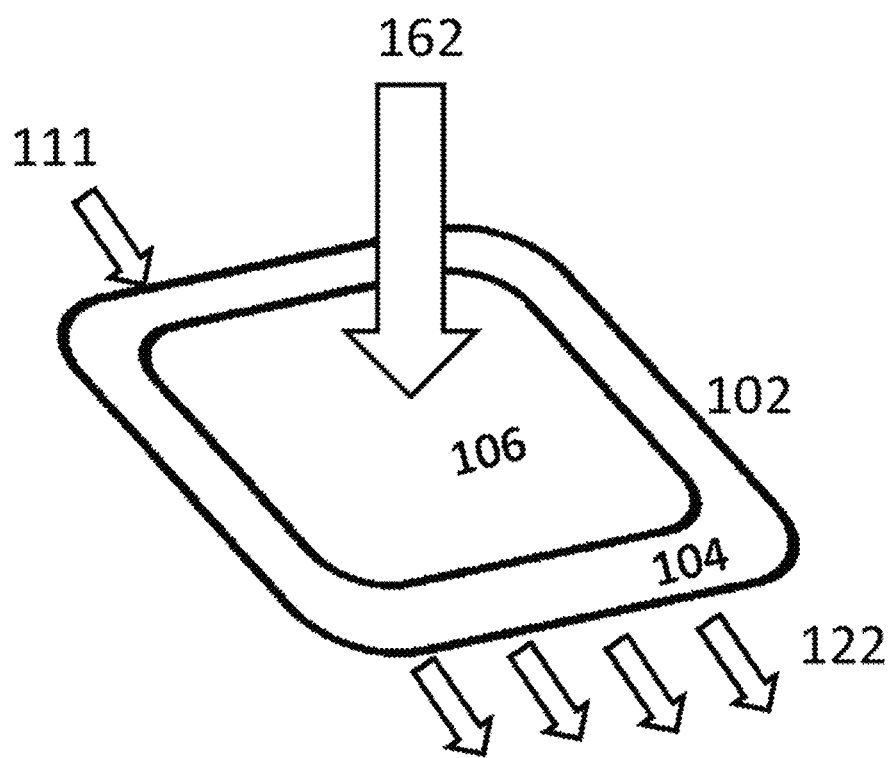
FIG. 3 illustrates operation of a system during a release time, according to an embodiment.

During a release time or release cycle, as shown in FIG. 3, hygroscopic material 106 retained within interior volume 104 releases water vapor into interior volume 104. During the release time, sealable housing 102 is exposed to the ambient environment that may heat hygroscopic material 106 via radiative, convective or conductive heat transfer mechanisms (e.g. during a daytime and/or high temperature ambient condition). In various embodiments, hygroscopic material 106 receives heat 162 from any desirable thermal energy source including but not limited to electromagnetic radiation (e.g. solar radiation), contact with a thermal conductor, directed acoustic or ultrasonic energy, and/or combinations or derivatives thereof. For example, in various embodiments, the top surface of sealable housing 102 absorbs and/or transmits solar radiation impinging on sealable housing 102 such that thermal energy is transferred to hygroscopic material 106. In some embodiments, the top surface of sealable housing 102 is a transparent element (e.g. glass or polycarbonate) configured to allow solar radiation to impinge on hygroscopic material 106. In some embodiments, the top surface of sealable housing 102 receives heat from an industrial or residential heat waste or exhaust source such that thermal energy transfers to hygroscopic material 106. In various embodiments, the release time corresponds to an environmental condition, whether measured and/or forecasted, having a solar insolation of at least about 150 W/m$^2$, at least about 175 W/m$^2$, at least about 200 W/m$^2$, at least about 225 W/m$^2$ (wherein about means +/−25 W/m$^2$).

In various embodiments, the release time corresponds to an environmental condition, whether measured or forecasted, having a solar insolation greater than 250 W/m$^2$. In various embodiments, the release time corresponds to an environmental condition, whether measured and/or forecasted, having a relative humidity of about 50% to about 100% relative humidity (wherein about means +/−5%) and a solar insolation of about 500 W/m$^2$ to about 1100 W/m$^2$ (wherein about means +/−25 W/m$^2$). In various embodiments, the release time corresponds to an environmental condition, whether measured and/or forecasted, having a relative humidity of about 80% to about 100% relative humidity (wherein about means +/−5%) and a solar insolation of about 800 W/m$^2$ to about 1100 W/m$^2$ (wherein about means +/−25 W/m$^2$).

Other approaches to utilizing waste heat can be employed, such as those described in International Patent Application No. PCT/US18/54715 filed Oct. 5, 2018 which is entitled "SYSTEMS FOR GENERATING WATER WITH WASTE HEAT AND RELATED METHODS THEREFOR." The content of the aforementioned application is incorporated herein by reference in its entirety. In various embodiments, water generating system 100 comprises a heater disposed in the interior volume 104 for heating hygroscopic material 106 during the release time.

During a release time, any desirable form of directed energy, in the form of photons, electromagnetic radiation, conduction, acoustic energy and/or the like can be employed to introduce thermal power or energy to the moisture-laden hygroscopic material so as to facilitate absorption of sufficient thermal energy and/or so as to maintain a desired rate of release of water vapor disposed in the hygroscopic material.

Sealable housing 102 can be provided in any desirable size, shape or color for efficient energy absorption. For example, in various embodiments, sealable housing 102 has a top surface configured for solar transmission of at least about 80%, at least about 85%, or at least about 90% (wherein about means +/−5%). However, sealable housing 102 may be configured for any level of solar transmission suitable to optimize impingement of solar radiation on hygroscopic material 106. In various embodiments, hygroscopic material 106 is configured to have a solar absorbance greater than 90% to maximize conversion of solar radiation into thermal energy. However, sealable housing 102 may be configured for any level of solar absorbance suitable to optimize conversion of solar radiation into thermal energy and/or transmission of thermal energy to hygroscopic material 106. In some embodiments, the heat 162 provided is waste heat, and hygroscopic material 106 is supported on a material exhibiting thermal conductivities at least about 150 W/mK, at least about 160 W/mK, at least about 170 W/mK, at least about 180 W/mK, at least about 190 W/mK to maximize heat transfer efficiency in sealable housing 102 (wherein about means +/−10 W/mK). In some embodiments, the heat 162 provided is waste heat, and hygroscopic material 106 is supported on a material exhibiting thermal conductivities greater than 200 W/mK to maximize heat transfer efficiency in sealable housing 102. However, hygroscopic material 106 may be supported on a material exhibiting any suitable level of thermal conductivity.

In various embodiments, sealable housing 102 has a top surface shaped so as to concentrate solar radiation onto hygroscopic material 106. For example, in various embodiments, sealable housing 102 has a curved surface. In various embodiments, sealable housing comprises light reflecting or refracting elements to focus light towards hygroscopic material 106. In various embodiments, sealable housing 102 has a back surface, disposed away from the top surface, having one or more reflective or refractive surfaces or elements so as to re-scatter solar radiation towards hygroscopic material 106. The back surface may be disposed perpendicular to the top surface. The back surface may be disposed opposite and generally parallel to the top surface, with the hygroscopic material 106 disposed therebetween. Any desirable structures, shapes, elements, surfaces and/or coatings can be provided to focus or direct solar radiation towards the hygroscopic material. In various embodiments, hygroscopic material 106 and/or the sealable housing 102 has a black finish.

As will be described in more detail below and with reference again to FIG. 3, in various embodiments, sealable housing 102 is under vacuum or negative pressure during the release time and a carrier gas 111 is leaked or otherwise introduced into interior volume 104. As used herein "leak," "leaked," and "leaking" refer interchangeably to communication of a carrier gas into the sealable housing while the sealable housing is under vacuum or negative pressure. In various embodiments, a carrier gas leak may comprise ambient air or any other suitable gas or gases capable of receiving water vapor. In other embodiments, a carrier gas leak may comprise helium. However, a carrier gas leak may comprise any suitable gas. In various embodiments, introduction of the leak is optional and/or controlled. In various embodiments, the carrier gas is leaked into the sealable housing via inlet 110. However, the carrier gas may be leaked into interior volume 104 via any suitable structure.

In various embodiments, carrier gas 111 is heated before or during input to interior volume 104 by any desirable heating mechanism or source (e.g. electric heater, solar thermal and/or the like). In various embodiments, heat is transferred from the expanded water vapor output 122 from the interior volume 104, at or above atmospheric pressure, to the carrier gas 111 entering interior volume 104 via a heat exchanger during a release time. In this way, efficient cooling and condensation of the water vapor output 122 and conversely heating and drying of the carrier gas 111 can be facilitated.

Turning again to FIG. 1, in various embodiments, water generating system 100 comprises a pump 120 (e.g. vacuum pump, positive displacement pump, compressor, and/or the like) operatively coupled to interior volume 104 to evacuate gases and/or fluids contained therein and/or to establish a low or reduced pressure condition in interior volume 104. For example, in various embodiments, pump 120 produces a reduced pressure condition within interior volume 104 which increases the ratio of the partial pressure of water vapor in the hygroscopic material 106 to the total pressure in the interior volume 104 during the release time.

In various embodiments, water generating system 100 further comprises a condenser unit 130 in fluid communication with the interior volume 104. The condenser unit 130 may be configured for condensing water vapor from the interior volume 104 into liquid water. In various embodiments, valve 132 and/or pump 120 may be operatively coupled to the condenser unit 130 and may be configured to control and/or direct communication of gases and/or fluids from the interior volume 104, to the condenser unit 130, and/or externally from water generating system 100. In various embodiments, condenser unit 130 is an enclosed vessel in fluid communication with interior volume 104. Condenser unit 130 may be configured to enable heat exchange between the produced water vapor output 122, when the produced water vapor output 122 is disposed in condenser unit 130, and ambient air or another suitable fluid external to condenser unit 130. Condenser unit 130 may be configured to decrease the temperature of produced water vapor output 122. Condenser unit 130 may be configured to drive produced water vapor output 122 and/or the output of pump 120 to dewpoint. Condenser unit 130 may be configured to lower the temperature of produced water vapor output 122 while collecting condensed water. Condenser unit 130 may comprise a size, shape, and/or other features that are configured to cause condensed water having a temperature just above ambient temperature when it exits valve 132.

In various embodiments, produced water vapor output 122 from interior volume 104 is output directly to the condenser unit 130 during the release time to at least atmospheric pressure. In some embodiments, the output of pump 120 has temperature Tp is monitored for control purposes, as discussed in more detail below. In other embodiments, without a pump, any desirable mechanism or element is employed to form a reduced pressure condition within the interior volume including passive or active vacuum techniques.

In various embodiments, methods for operating water generating system 100 to maximize the liquid water production rate comprise varying the load and release times in an alternating manner. For example, in various embodiments, the load and release times are time durations corresponding to nighttime and daytime environmental conditions, respectively. In various embodiments, one or more valves are actuated to seal or open the sealable housing 102 between alternating cycles of load times and release times. In some embodiments, valves 112, 118 and 132 are actuated in an alternating manner according to the diurnal cycle such that valves 112, 118 and 132 are closed to seal interior volume 104 during a release time and open interior volume 104 during a load time.

In various embodiments, water generating system 100 comprises ancillary energy generation and/or energy storage components configured to provide power to at least a portion of water generating system 100 (e.g., fan 114, pump 120, valves 112, 118, 132, and/or the like). For example, in various embodiments, water generating system 100 comprises a solar power unit 140 configured to convert solar insolation to electrical power (e.g., photovoltaic module or panel) and a battery 142 to store power as electrochemical energy and provide power to water generating system 100 in the absence of solar radiation.

In various embodiments, water generating system 100 comprises various peripheral devices, such as sensors (e.g., temperature sensors, humidity sensors, solar insolation sensor, flow rate sensors, water level sensors, and/or the like). In various embodiments, sensors provide signals indicative of ambient air temperature, ambient pressure, ambient air relative humidity, solar insolation, solar flux, weather forecast, time of day, and/or the like. Furthermore, in various embodiments, sensors generate signals relating to system operational parameters like interior volume temperature, interior volume pressure, interior volume relative humidity, interior volume water vapor partial pressure, pump discharge temperature, pump discharge pressure, condenser unit discharge temperature, liquid water production rate, liquid water production volume, liquid water usage rate, liquid water quality and/or the like.

Sensors may be located within water generating system 100, or remotely from water generating system 100, or both. Sensors may provide data to system components via a wired and/or wireless connection. For example, a town, village, city, and/or the like may include a plurality of the present water generating systems 100, and one of the plurality of the present water generating systems 100 may provide data indicative of ambient environmental conditions (e.g., air temperature, air relative humidity, a solar insolation level, and/or the like) to another one of the plurality of the present water generating systems 100. In this way, a single sensor may be shared by multiple water generating systems 100.

In various embodiments, water generating system 100 includes a controller 150 configured to control system 100 to maximize the production of liquid water from condenser unit 130. In various embodiments, controller 150 maximizes the production of liquid water by optimizing or adjusting the partial pressure of water vapor on or above hygroscopic material 106 within interior volume 104 with respect to the reduced pressure condition.

In various embodiments, methods for operating water generation system 100 include forming the reduced pressure condition by maintaining a pressure in interior volume 104 below the atmospheric pressure surrounding the interior volume such that the water vapor captured by hygroscopic material 106 during the load time approaches vapor pressure saturation. In various embodiments, a reduced pressure condition is formed within interior volume 104 such that the reduced pressure condition increases a ratio of the vapor pressure of water captured by or relative to hygroscopic material 106 to the water vapor partial pressure in the interior volume. In various embodiments, a reduced pressure condition is formed within the interior volume 104 such that the reduced pressure condition increases a ratio of the vapor pressure of water captured by hygroscopic material 106 to the total pressure in interior volume 104. In various embodiments, the reduced pressure condition is a pressure below about 0.8 atm, about 0.7 atm, or about 0.6 atm (wherein about means +/−0.05 atm). In various embodiments, the reduced pressure condition is a pressure below about 0.5 atm (wherein about means +/−0.05 atm).

As understood herein, water vapor pressure or equilibrium vapor pressure of water is the pressure exerted by water vapor in thermodynamic equilibrium with its condensed phase disposed in the hygroscopic material or relative to the hygroscopic material at a given temperature. As understood herein, water vapor partial pressure in the interior volume is the pressure that would be exerted by water vapor in a gas mixture if it alone occupied the interior volume. As understood herein, the total pressure in the interior volume is the sum of the partial pressures of all gases in the mixture.

Figure 4A:
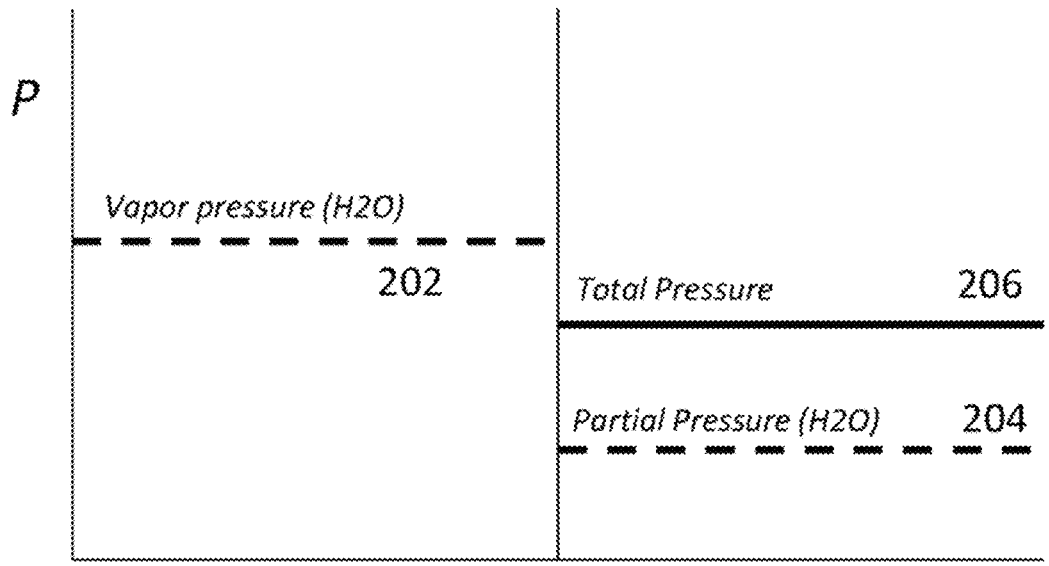
FIG. 4(a) illustrates a diagram depicting system operation, according to an embodiment.

FIG. 4(a) is a diagram depicting operation of water generating system 100 at a reduced pressure condition during the release time, wherein the water vapor pressure 202 captured by hygroscopic material is greater than both 1) partial pressure of water vapor 204 in the interior volume and 2) total pressure of gases 206 in the interior volume, where the water vapor that was captured by hygroscopic material 106 during the load time approaches vapor pressure saturation. The reduced pressure condition can be optimized, dynamically or otherwise, by increasing the ratio of water vapor pressure 202 captured by the hygroscopic material to the total pressure 206 of gases in the interior volume, as depicted in FIG. 4(a). In various embodiments, when water generating system 100 comprises a reduced pressure condition as illustrated in FIG. 4(a), water vapor may be removed from interior volume 104 through outlet 116 by the activation of pump 120.

Figure 4B:
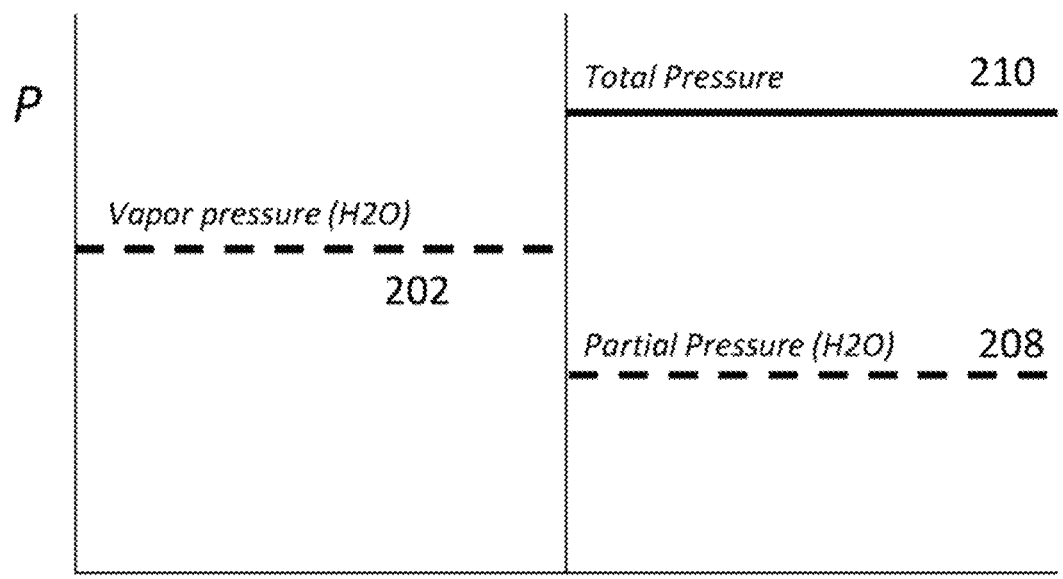
FIG. 4(b) illustrates a diagram depicting system operation, according to an embodiment.

FIG. 4(b) is a diagram depicting system operation at a reduced pressure condition wherein the water vapor pressure 202 captured by the hygroscopic material is greater than the partial pressure 208 of water vapor in the interior volume and less than the total pressure 210 of gases in the interior volume. Under certain circumstances, total pressure 210 may be greater than water vapor pressure 202, for example, when water vapor has been removed from the hygroscopic material, when there is insufficient insolation, and/or when the loading conditions are not optimized (e.g., low humidity, high temperature, high solar insolation, etc.). Under such circumstances, a carrier gas leak may be introduced to tune the reduced water pressure condition such that water vapor pressure 202 becomes higher than the water vapor partial pressure 208 and the total pressure 210 of the interior volume 208, thereby causing release of water vapor from the hygroscopic material. In various embodiments, when water generating system 100 comprises a reduced pressure condition as illustrated in FIG. 4(b), water vapor may be removed from interior volume 104 through outlet 116.

The reduced pressure condition can be optimized, dynamically or otherwise, by increasing the ratio of water vapor pressure 202 captured by the hygroscopic material to the water vapor partial pressure 204 and 208 in the interior volume, as depicted in FIG. 4(a) and FIG. 4(b). In a control scheme, the reduced pressure condition is optimized or tuned such that the water vapor pressure 202 captured by the hygroscopic material is maintained higher than the water vapor partial pressure 204 and 208 in the interior volume, as depicted in FIG. 4(a) and FIG. 4(b) during the release time.

Figure 7:
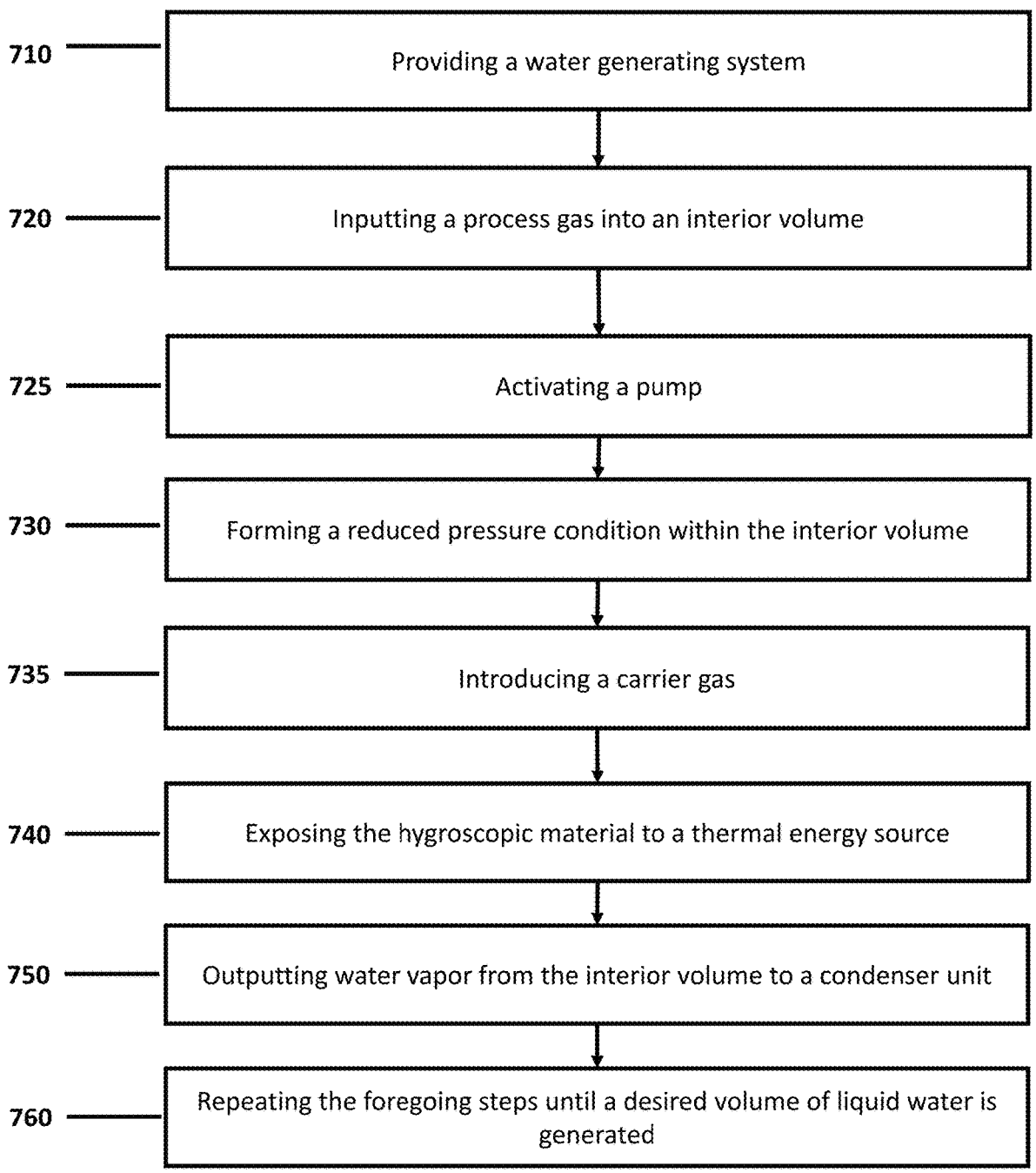
FIG. 7 illustrates a flow chart of an exemplary method, according to an embodiment.

FIG. 7 illustrates a flow chart of an exemplary method 700 of producing liquid water from a process gas (e.g. ambient air) in accordance with certain embodiments. Method 700 is merely exemplary and is not limited to the embodiments presented herein. Method 700 can be employed in many different embodiments or examples not specifically depicted or described herein. In some embodiments, the activities of method 700 are performed in the order presented. In other embodiments, the activities of the method 700 can be performed in any other suitable order. In still other embodiments, one or more of the activities in method 700 can be combined, skipped, or omitted. In many embodiments, the system is similar or identical to the water generating system 100 of FIG. 1.

In various embodiments, method 700 comprises activity 710 of providing a water generating system comprising a sealable housing defining an interior volume, a hygroscopic material retained within the interior volume, and a condenser unit operatively coupled to the interior volume. In some embodiments, the system is similar or identical to the water generating system 100 of FIG. 1.

In various embodiments, method 700 comprises activity 720 of inputting a process gas into the interior volume during a load time. In various embodiments, method 700 comprises activity 730 of forming a reduced pressure condition within the interior volume during a release time. In various embodiments, method 700 comprises activity 740 of exposing the hygroscopic material to a thermal energy source during the release time. In various embodiments, method 700 comprises activity 750 of outputting water vapor from the interior volume to the condenser unit during the release time. In various embodiments, method 700 comprises activity 760 of repeating any one or more steps of method 700 until a desired volume of liquid water is reached.

A method for operating water generation system 100 during release of water vapor into the interior volume 104 comprises retaining the pressure within interior volume 104 below that of the atmospheric water vapor pressure to which the hygroscopic material 106 was exposed during a load time. In various embodiments, method 700 comprises activity 725 activating pump 120 to evacuate interior volume 104 to pressure at or below atmospheric pressure. In various embodiments, method 700 comprises activity 735 introducing a carrier gas leak (e.g. 111) into interior volume 104 during a release time. For example, in some embodiments, while interior volume 104 is under a negative pressure (e.g. relative to atmospheric pressure), a carrier gas 111, from the atmosphere (e.g. via inlet 110) or elsewhere, is input into interior volume 104 during the release time. Without wishing to be to be bound by any particular theory, the hygroscopic material-respired water vapor and leak carrier gas mixture may produce an elevated total pressure within interior volume 104 and/or within the condenser unit 130. The elevated total pressure may result in a phase change of the water vapor into liquid water once the mixture is moved to a higher-pressure condition via pump 120, for example, to the condenser unit 130.

In various embodiments, methods for operating water generating system 100 comprise adjusting the reduced pressure condition by adjusting the pump rate and/or adjusting the flow rate of carrier gas 111 into interior volume 104 to continuously drive efficient water vapor release and capture from the hygroscopic material 106. In various embodiments, forming, optimizing, and/or tuning the reduced pressure condition within interior volume 104 includes controlling the pump rate to increase the ratio of partial pressure of water vapor on or above the hygroscopic material 106 to the partial pressure of water vapor disposed in the gas in interior volume 104. Such an increased ratio may increase the water vapor and/or liquid flow output 122 from the interior volume 104 to the output of pump 120 during the release time.

Figure 5A:
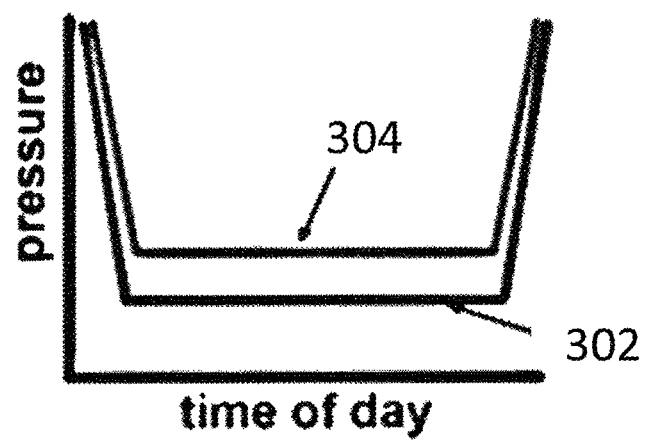
FIG. 5(a) illustrates an example of system operation, according to an embodiment.
Figure 5B:
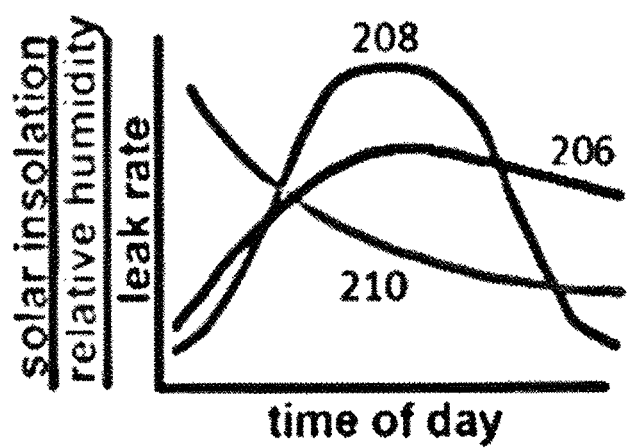
FIG. 5(b) illustrates an example of system operation, according to an embodiment.

An illustrative example of the operation of water generating system 100 is shown in FIGS. 5(*a*) and 5(*b*). In various embodiments, pump 120 produces a generally constant reduced absolute pressure 302 within interior volume 104, for example in the range of 10-14 psi below atmospheric pressure during the release time (e.g. during daytime), as indicated in FIG. 5(*a*), where the x-axis generally represents one day beginning at 12:00 am and ending at 11:59 pm. In various embodiments, water generating system 100 is configured to maintain the then-present equilibrium water vapor pressure 304 in or above hygroscopic material 106 at a pressure slightly above the reduced absolute pressure 302 and/or above the reduced water vapor partial pressure, for example between 9-12 psi below atmospheric pressure, by introducing or leaking a carrier gas 111 into interior volume 104 at a rate that is dynamically adjusted during the release time (e.g. during daytime), as indicated in FIG. 5(*a*).

In various embodiments, the rate of leaked carrier gas 111 input into interior volume 104 is adjusted with conditions that drive variations in partial pressures of water vapor in the interior volume 104 (e.g. high ambient humidity leak or high thermal power input). In the example depicted in FIG. 5(*b*), where the x-axis represents one day beginning at 12 am, and ending at 11:59 pm, the leak rate 306 is increased during a first portion of the day when solar insolation 308 is increasing so as to optimize water vapor partial pressure and/or decrease relative humidity 310 within the interior volume. Similarly, the rate of leak of carrier gas 111 input into the interior volume can be adjusted to decrease with conditions that inhibit saturation of water vapor in the interior volume 104 (e.g. low ambient humidity leak or low thermal power input). As shown in FIG. 5(*b*), the leak rate 306 is decreased during a second portion of the day when solar insolation 308 is decreasing and with relative humidity 310 continuing to decrease within the interior volume 104.

Figure 6:
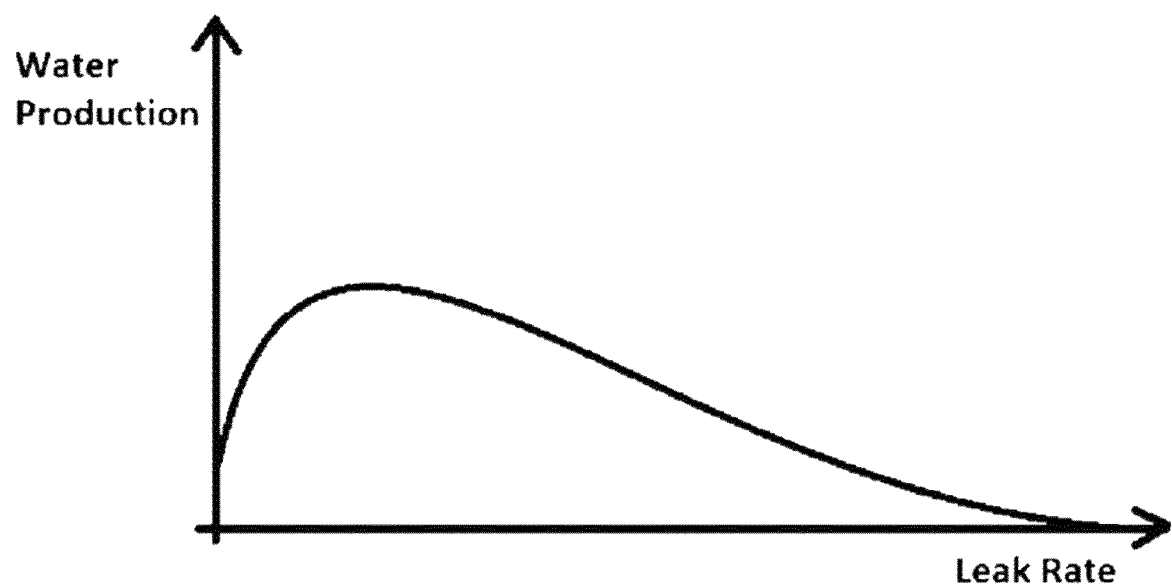
FIG. 6 illustrates an operational example of system operation, according to an embodiment.

In various embodiments, water generating system 100 is configured to optimize liquid water production by optimizing the reduced pressure condition within the interior volume 104, for example by determining an optimal rate of carrier gas 111 leaked or input into the interior volume 104. FIG. 6 illustrates an operational example of optimizing the rate of carrier gas 111 input to interior volume 104 for maximizing water production. For a set of conditions (e.g. solar flux, ambient pressure, ambient temperature, ambient relative humidity, and amount of water captured by hygroscopic material during a previous load time), a maximum amount of water production at an optimum rate of carrier gas 111 leaked or input into the interior volume 104 can be discovered, as illustrated in the example of FIG. 6. Without wishing to be bound by any particular theory, it is believed that leak rates below the optimum rate limit result in an insufficient removal rate of water vapor from the hygroscopic material to maximize water production; it is believed that leak rates above the optimum rate limit dilute the air-water mixture and, by extension, decrease the ability to condense the water downstream at the condenser. In various embodiments, controller 150 may impose a lower limit for the leak rate so as to prevent or minimize steep operational drop-off of water production at leak rates lower than the optimal leak rate. In various embodiments, controller 150 may impose an upper limit for the leak rate so as to prevent or minimize steep operational drop-off of water production at leak rates higher than the optimal leak rate.

In various embodiments, the optimum leak rate has a positive correlation with the following conditions:
1) higher thermal power, via solar thermal heating or other heating mechanism;
2) higher heat transfer rate to hygroscopic material;
3) higher material loading (possibly due to available water and less binding energy), and
4) higher ambient relative humidity, (possibly due to a greater flow required to avoid air saturation).

It should be appreciated that this example is provided for ease of description only, and the particular ambient conditions and operational behavior can change daily, seasonally, geographically, and so on, which in turn can change the optimum operational setpoints of the system.

In various embodiments, a method of operating water generating system 100 comprises determining if a pressure (for example, a water vapor partial pressure) in interior volume 104 is below a predetermined minimum pressure value; and in response to determining that the pressure within interior volume 104 is below a predetermined minimum pressure value, introducing or leaking a carrier gas 111 into interior volume 104 until the pressure within interior volume 104 rises above a predetermined upper threshold pressure. In various embodiments, direct measurement of the water vapor partial pressure within interior volume 104 is made in real time with sensors. In various embodiments, carrier gas 111 is introduced to ensure that the value of the measured water vapor partial pressure remains below the equilibrium water vapor partial pressure above the hygroscopic materials, thereby ensuring that there is a thermodynamic driving force for the evolution of water vapor from the hygroscopic materials 106 into the gas phase of interior volume 104. In other embodiments, a pump rate and carrier gas flow rate are selected to vary throughout the release time based on environmental conditions or other sensed data related to the system status.

Various approaches may be employed to control or optimize the reduced pressure condition within interior volume 104 so as to drive the water vapor captured by hygroscopic material 106 during the load time towards vapor pressure saturation during the release time. In various embodiments, controller 150 operates water generating system 100 based on one or more of: a user selection, data received from one or more sensors, programmatic control, and/or by any other desirable bases. In various embodiments, controller 150 is associated with peripheral devices (including sensors) for sensing data information, data collection components for storing data information, and/or communication components for communicating data information relating to the operation of water generating system 100. In various embodiments, controller 150 uses a set of sensors, an onboard deterministic and/or machine learning algorithm, information regarding the thermodynamics of water vapor, information regarding the properties of the hygroscopic materials, and/or other factors that are synthesized in controller 150 to optimize water production. In various embodiments, controller 150 sets pump rates and leak rates based on a look up table of parameters stored on controller 150. In various embodiments, controller 150 self-adjusts pump or leak rates and monitors water production signals in an effort to self-teach or learn optimum setpoints.

In various embodiments, controller 150 is programmed or configured to optimize liquid water production by controlling the reduced pressure condition within the interior volume based on measurements of one or more inputs (e.g., such that controller 150 may optimize liquid water production based on current or expected environmental and system conditions) including but not limited to external conditions like ambient air temperature, ambient pressure, ambient air relative humidity, solar insolation, solar flux, weather forecast, time of day, etc. In various embodiments, controller 150 is programmed or configured to optimize liquid water production by controlling the reduced pressure condition within interior volume 104 based on inputs relating to system operational parameters like interior volume temperature, interior volume pressure, interior volume relative humidity, interior volume water vapor partial pressure, pump discharge temperature, pump discharge pressure, condenser unit discharge temperature, liquid water production rate, liquid water production volume, liquid water usage rate, liquid water quality and so on.

In various embodiments, water generating system 100 comprises a telematics unit 152 (e.g., a transmitter, receiver, transponder, transverter, repeater, transceiver, and/or the like) to communicate operational parameters and/or data to and/or from water generating system 100 (e.g., through controller 150) via a wired and/or wireless interface. In various embodiments, wireless communications conform to standardized communications protocols, such as, for example, GSM, SMS components operating at relatively low rates (e.g., operating every few minutes), and/or protocols that are geographically specified.

In various embodiments, water generating system 100 comprises indicators (e.g., lights, such as LEDs), which are configured to provide information regarding system operation. For example, in some embodiments, indicator lights are configured to provide information (e.g., visually to a user) that the system is running, that solar power or insolation is available, that maintenance is recommended, or a component has failed and/or is failing, etc. Any desirable information (including the information described above with reference to indicators) may be transmitted over a communications network (e.g., alone and/or in addition to operation of any indicators).

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, and/or solution to occur or become more pronounced, however, are not to be construed as critical, required, or essential features or elements of any or all of the claims, unless such benefits, advantages, solutions, and/or elements are stated in such claim.

Moreover, embodiments and limitations disclosed herein are not dedicated to the public under the doctrine of dedication if the embodiments and/or limitations: (1) are not expressly claimed in the claims; and (2) are, or potentially are, equivalents of express elements and/or limitations in the claims under the doctrine of equivalents.

The invention claimed is:

1. A system for producing liquid water from a process gas, the system comprising:
    a sealable housing defining an interior volume, the sealable housing comprising a process gas inlet configured to input the process gas into the interior volume during a load time;
    a hygroscopic material retained within the interior volume, wherein the hygroscopic material is configured to capture water vapor from the process gas during the load time, and wherein the hygroscopic material is configured to absorb thermal energy during a release time; and
    a means for producing a reduced pressure condition within the interior volume during the release time, wherein the reduced pressure condition is characterized by reduction of a partial pressure of water vapor within the interior volume to below a vapor pressure of water captured by the hygroscopic material during the load time;
    wherein the means for producing the reduced pressure condition comprises the process gas inlet, and wherein the process gas inlet is configured to leak a carrier gas into the interior volume during the release time.

2. The system of claim 1, further comprising a condenser unit operatively coupled to the interior volume and configured to condense the water vapor from the interior volume into the liquid water during the release time.

3. The system of claim 1, wherein the process gas comprises ambient air.

4. The system of claim 1, further comprising a heater disposed in the interior volume, wherein the heater is configured to provide thermal energy to the hygroscopic material during the release time, and wherein the heater is configured for actuation in association with the means for producing a reduced pressure condition.

5. The system of claim 1, wherein a surface of the sealable housing comprises a solar absorbance of at least 90%.

6. The system of claim 1, further comprising an energy generation device configured to generate power from solar energy, and an energy storage device configured to store energy generated by the energy generation device.

7. The system of claim 1, wherein the means for producing the reduced pressure condition comprises a pump configured to evacuate the interior volume.

8. The system of claim 7, further comprising:
one or more sensors; and
a controller coupled to the one or more sensors, the pump, and the carrier gas inlet, wherein the controller is configured to maximize a liquid water production rate in the condenser unit by adjusting the reduced pressure condition during the release time.

9. The system of claim 8, wherein adjusting the reduced pressure condition comprises adjusting one or more of: a pump rate at which the pump evacuates the interior volume, and a flow rate at which the carrier gas is input into the interior volume.

10. The system of claim 8, wherein the one or more sensors generate a signal relating to one or more of: ambient temperature, ambient pressure, ambient relative humidity, solar flux, weather forecast, time of day, interior volume temperature, interior volume pressure, interior volume relative humidity, interior volume water vapor partial pressure, pump discharge temperature, pump discharge pressure, condenser discharge temperature, liquid water production rate, liquid water production volume, and liquid water quality.

11. The system of claim 8, wherein the system further comprises a process gas inlet valve and a carrier gas inlet valve for sealing the sealable housing and, wherein maximizing the liquid water production rate further comprises opening the process gas inlet valve and closing the carrier gas inlet valve during the load time, and closing the process gas inlet valve and opening the carrier gas inlet valve during the release time.

12. The system of claim 8, wherein the system further comprises a process gas inlet valve and a carrier gas inlet valve for sealing the sealable housing and, wherein maximizing the liquid water production rate further comprises opening the process gas inlet valve and closing the carrier gas inlet valve during nighttime, and closing the process gas inlet valve and opening the carrier gas inlet valve during daytime, according to a to a diurnal cycle.

13. A method for producing liquid water from a process gas comprising:
inputting the process gas through a process gas inlet into an interior volume defined by a sealable housing during a load time, wherein a hygroscopic material retained within the interior volume is configured to capture water vapor from the process gas during the load time;
forming a reduced pressure condition within the interior volume during a release time by increasing a ratio of vapor pressure of water captured by the hygroscopic material to water vapor partial pressure in the interior volume;
wherein the forming of the reduced pressure condition comprises inputting a carrier gas into the interior volume during the release time; and
wherein the carrier gas is leaked into the sealable housing via the process gas inlet;
exposing the hygroscopic material to a thermal energy source during the release time, wherein the hygroscopic material is configured to absorb thermal energy during the release time; and
communicating a water vapor output from the interior volume during the release time.

14. The method of claim 13, further comprising:
condensing, by a condenser unit, water vapor output from the interior volume into liquid water during the release time; and
repeating at least one of the inputting, the forming, the exposing, the outputting, and the condensing until a desired volume of liquid water is reached.

15. The method of claim 13, wherein the thermal energy source comprises solar radiation, and wherein the solar radiation is transmitted through the sealable housing.

16. The method of claim 15, wherein the load time is a first time duration corresponding to a nighttime environmental condition, wherein the release time is a second time duration corresponding to a daytime environmental condition, and wherein the load time and the release time occur in an alternating manner according to a diurnal cycle.

17. The method of claim 15, wherein the load time is a first time duration corresponding to a first environmental condition, measured or forecasted, having a relative humidity greater than 30% and a solar insolation less than 250 W/m$^2$, and wherein the release time is a second time duration corresponding to a second environmental condition, measured or forecasted, having a solar insolation greater than 250 W/m$^2$.

18. The method of claim 13, wherein the thermal energy source comprises waste heat generated from industrial or residential heat waste.

19. The method of claim 13, wherein the forming of the reduced pressure condition further comprises increasing a ratio of vapor pressure of water captured by the hygroscopic material to a total pressure of gases in the interior volume.

20. The method of claim 13, wherein the forming of the reduced pressure condition further comprises retaining a pressure in the interior volume below an atmospheric pressure surrounding the sealable housing such that the water vapor captured by the hygroscopic material during the load time approaches vapor pressure saturation.

21. The method of claim 13, wherein a pump is operatively coupled to the interior volume, and wherein the forming of the reduced pressure condition comprises activating the pump to evacuate the interior volume during the release time.

22. The method of claim 13, wherein the carrier gas comprises ambient air.

23. The method of claim 13, further comprising heating the carrier gas with the thermal energy source.

24. The method of claim 23, wherein the heating of the carrier gas comprises transferring heat from the water vapor output to the carrier gas via a heat exchanger during the release time, thereby promoting cooling and condensation of the water vapor output and conversely heating and drying of the carrier gas.

25. The method of claim 13, wherein a controller is configured to control one or more of: a flow rate of the carrier gas into the interior volume, and a pump rate of a pump.

26. The method of claim 25, wherein the controller communicates with one or more sensors, wherein the one or more sensors are configured to detect one or more of: a pressure of gases in the interior volume, a temperature within the interior volume, a temperature of the carrier gas, an ambient temperature, a time of day, weather forecast, solar flux, a relative humidity of the carrier gas, a relative humidity of the process gas during the load time, a temperature of the water vapor output, a flow rate of the water vapor output, the water vapor partial pressure within the interior volume, a water vapor partial pressure output from the interior volume, a water production rate, and a water production volume.

27. The method according of claim 25, wherein the controller employs an algorithm to determine optimal control conditions for one or more of: the flow rate of the carrier gas into the interior volume, and the pump rate of the pump, as a function of one or more of: a pressure of gases in the interior volume, a temperature within the interior volume, a temperature of the carrier gas, an ambient temperature, a time of day, weather forecast, solar flux, a relative humidity of the carrier gas, a relative humidity of the process gas during the load time, a temperature of the water vapor output the flow rate of the water vapor output, the water vapor partial pressure within the interior volume, a water vapor partial pressure output from the interior volume, a water production rate, and a water production volume.

28. The method of claim 13, wherein the reduced pressure condition is a pressure below 0.5 atm.

29. A system comprising:

a sealable housing defining an interior volume, the sealable housing comprising a process gas inlet configured to input the process gas into the interior volume during a load time; and a hygroscopic material retained within the interior volume, wherein the hygroscopic material is configured to capture water vapor from the process gas during the load time, and wherein the hygroscopic material is configured to absorb thermal energy during a release time, and, wherein the carrier gas is leaked into the sealable housing via the process gas inlet;

wherein the sealable housing is configured to enable for a reduced pressure condition within the interior volume during the release time, and wherein the reduced pressure condition is characterized by reduction of a partial pressure of water vapor within the interior volume to below a vapor pressure of water captured by the hygroscopic material during the load time.

30. The system of claim 29, further comprising:

a pump configured to evacuate the interior volume.

* * * * *